Aug. 11, 1925.
W. C. ALLEN
1,549,282
AUTOMATIC PRESSURE VALVE
Filed Aug. 27, 1924
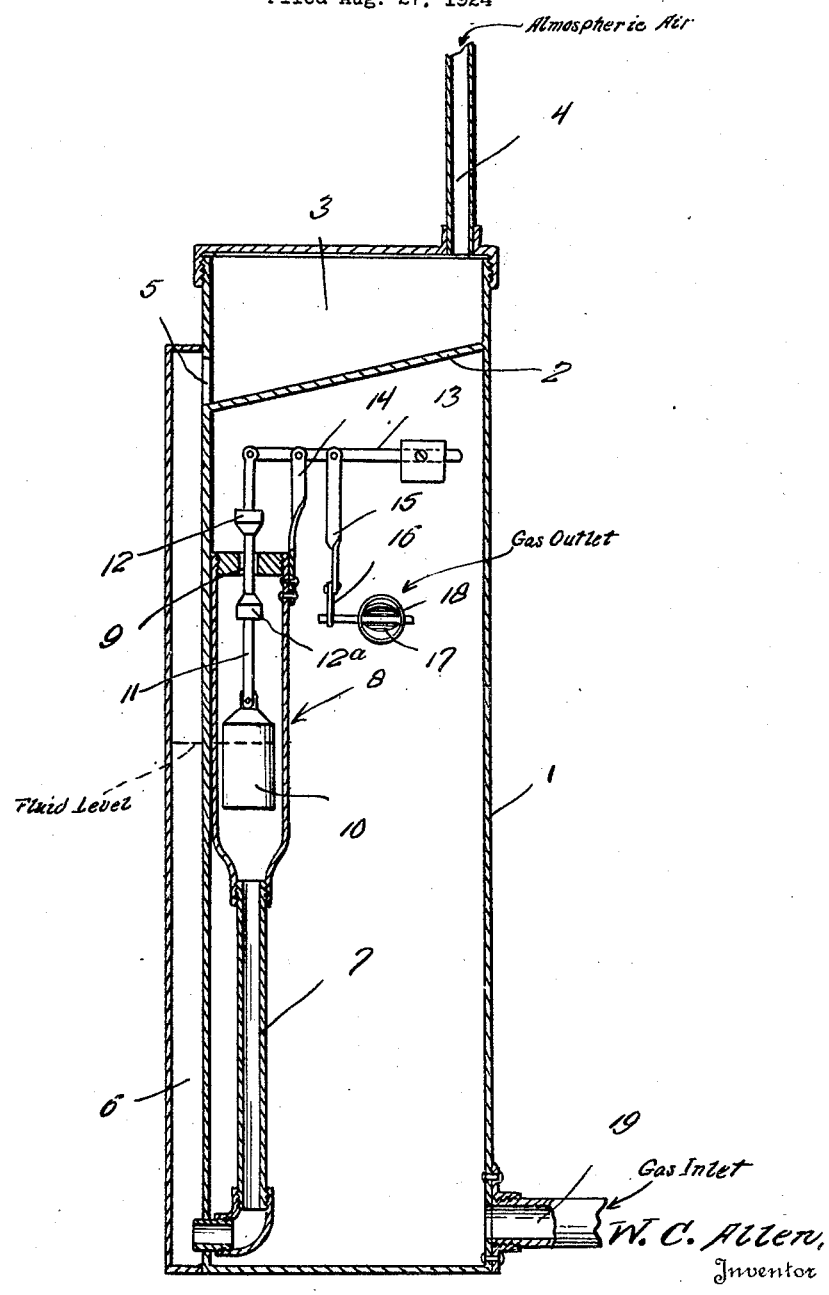

Patented Aug. 11, 1925.

1,549,282

UNITED STATES PATENT OFFICE.

WILLIAM C. ALLEN, OF TAFT, CALIFORNIA.

AUTOMATIC PRESSURE VALVE.

Application filed August 27, 1924. Serial No. 734,443.

*To all whom it may concern:*

Be it known that I, WILLIAM C. ALLEN, a citizen of the United States, residing at Taft, in the county of Kern and State of California, have invented certain new and useful Improvements in an Automatic Pressure Valve, of which the following is a specification.

This invention relates to an improved valve for installation in a fluid line and the same may be conveniently referred to as an automatic pressure controlling valve.

It is my principal object to generally improve upon valves of this class by providing one which is such in construction as to render it absolutely positive in operation so that when the pressure in the suction line becomes dangerously low, that line will be automatically closed until the desired pressure is built up.

More specifically speaking, I propose to provide a valve of this class which is constructed to provide liquid fluid chambers wherein the liquid fluid is acted on by atmospheric air to close the gas valve until the desired pressure is built up, whereupon the fluid is then acted on by the gaseous pressure for opening the gas line controlling valve to permit unrestricted passage of gas therethrough.

In carrying out this invention I have conceived of a novel construction and arrangement of parts which insure an advantageous device and these features and details will become apparent from the following description and drawing.

In the accompanying drawing,

The figure represents a central vertical section, with parts in elevation, through a pressure valve constructed in accordance with the present invention.

In carrying out the invention, I employ a vertically elongated cylinder 1 which constitutes the gas compartment. At its top, this cylinder is provided with a diaphragm 2 forming an air chamber 3 at this end of the device. A pipe 4 is connected with the chamber 3 and is open to atmospheric air which passes therethrough and thence through the chamber 3 and port 5 into a vertically elongated liquid fluid containing chamber 6. From the chamber 6, a portion of the fluid therein flows through the conduit 7 into a float chamber 8. The chamber 8 is closed at its top by a centrally apertured plug 9 which functions additionally as a valve seat member. A float 10 is vertically movable in the chamber 8 and is suspended in the position as shown by the fluid entering the latter. The float is equipped with a stem 11 which is in turn provided intermediate its ends with beveled or conical enlargements 12 and 12ª forming valves for alternate cooperation with the aforesaid valve seat member 9. The stem 11 extends through the opening in the last named member and a horizontal lever 13 is pivotally connected thereto, the lever in turn being pivotally connected to an upstanding bracket 14 on the float chamber. The lever is properly counter-balanced by a weight as seen, and a pair of suitably constructed depending links 15 and 16 are connected thereto, the link 16 being in turn connected to the rotating shaft of a common throttle valve 17 in the gas outlet pipe 18. Gas enters the cylinder 1 through the medium of the pipe 19.

The operation of the device is as follows:—The gas in order to pass from the supply pipe 19 to the discharge pipe 18 must pass into the cylinder 1. The float 10 in the chamber 8 takes the position according to the pressure of the gas within the cylinder 1. For instance, if the pressure is exceedingly low, the atmospheric air in entering the pipe 4 is active on the fluid in the chamber 6 to an extent to exert a downward pressure thereon and to elevate the float 10 in a manner to simultaneously close the valve 12 and 17, thus preventing the entrance of gas into the float chamber and preventing the passage of gas through the discharge pipe. The parts of the device retain these relative positions until the pressure builds up to an extent to overbalance and open the counter-balance and fluid closed valve 12ª. When the pressure is thus sufficient, the fluid in the float chamber recedes and the float descends, acting on the lever and linkage in a manner to open the throttle valve and to permit unrestricted passage of gas through the discharge pipe 18. So long as the pressure is sufficient, the part 3 remains in the positions then assumed.

Undoubtedly, a careful consideration of the foregoing description in connection with the drawings will enable persons skilled in the art to which the invention relates to obtain a clear understanding of the same. For this reason I do not believe that it is necessary to enter a more lengthy description.

In carrying out this invention I have chosen to utilize a specific structure. It is to be understood however that minor changes which fall within the field of invention claimed may be resorted to if necessary or desired.

Having thus described my invention, what I claim is:—

In an automatic pressure valve of the class described, a vertically elongated cylinder, gas inlet and outlet pipes connected therewith, said cylinder being provided adjacent its top with a partition forming an air chamber between said partition and cylinder top, an atmospheric air pipe connected to the top of said cylinder, a fluid chamber formed integral with one side of said cylinder and communicating with said air chamber, a separate float housing arranged within said cylinder, a pipe connecting said housing with said fluid chamber, float mechanism connected to the said housing and contained within the said cylinder and including a stem, a double valve formed upon the stem, a bracket carried by said float chamber, a lever pivoted between its ends on said bracket, said float stem being connected to one end of said lever on one side of said bracket, and linkage connected to the intermediate portion of the lever on the opposite side of the bracket, and a valve in said gas outlet pipe with which said linkage cooperates.

In testimony whereof I affix my signature.

WILLIAM C. ALLEN.